United States Patent [19]

Allain et al.

[11] 4,208,392
[45] Jun. 17, 1980

[54] TWO-STEP PROCESS FOR REMOVING BORON COMPOUNDS FROM AQUEOUS SOLUTIONS OF MAGNESIUM CHLORIDE

[75] Inventors: Ronald J. Allain, Richmond, Tex.; David G. Braithwaite, Village of Golf, Fla.; Ansell L. Reid, Sugar Land, Tex.

[73] Assignee: Nalco Chemical Co., Oak Brook, Ill.

[21] Appl. No.: 23,066

[22] Filed: Mar. 23, 1979

[51] Int. Cl.$^2$ .............................................. C01F 5/30
[52] U.S. Cl. ............................................................ 423/497
[58] Field of Search ............... 423/497, 498, 283, 157; 260/462 R; 203/12, 14, 56, 64

[56] References Cited

U.S. PATENT DOCUMENTS

| | | | |
|---|---|---|---|
| 1,308,576 | 1/1919 | Calvert | 260/462 R |
| 1,308,577 | 1/1919 | Calvert | 423/283 |
| 2,402,959 | 7/1946 | Gustafson | 423/178 |
| 2,689,259 | 9/1954 | Schechter | 260/462 R |
| 2,808,424 | 10/1957 | May | 260/462 R |
| 2,884,440 | 4/1959 | Tyson | 260/462 R |
| 2,969,275 | 1/1961 | Garrett | 423/283 |
| 3,020,308 | 2/1962 | Stange | 260/462 R |
| 3,072,704 | 1/1963 | Carpenter | 260/462 R |
| 3,111,383 | 11/1963 | Garrett | 423/283 |
| 3,230,245 | 1/1966 | Binning | 260/462 R |
| 3,424,563 | 1/1969 | Grinstead | 423/276 |
| 3,493,349 | 2/1970 | Schiappa | 423/280 |
| 3,679,751 | 7/1972 | Golden | 260/462 R |
| 3,855,392 | 12/1974 | Folkestad | 423/497 |
| 4,035,469 | 7/1977 | Richmond | 423/497 |
| 4,058,588 | 11/1977 | Brown | 423/283 |

*Primary Examiner*—Brian E. Hearn
*Attorney, Agent, or Firm*—John G. Premo; Robert A. Miller

[57] ABSTRACT

A two-step process for removing boron impurities from aqueous solutions of magnesium chloride which comprises treating these solutions with more than 3 moles of methanol in the presence of an acid catalyst to form trimethyl borate and then removing the trimethyl borate and excess methanol from such solutions by means of distillation and then extracting from the thus-treated solutions any remaining boron compounds by means of a hydrocarbon liquid.

The hydrocarbon liquid extraction step may be used prior to the methanol treatment.

4 Claims, No Drawings

TWO-STEP PROCESS FOR REMOVING BORON COMPOUNDS FROM AQUEOUS SOLUTIONS OF MAGNESIUM CHLORIDE

INTRODUCTION

Magnesium chloride intended to be used for the electrolytic production of magnesium should, preferably, contain only a minimum of boric acid and salts thereof. It is well known that the presence of even a small amount of boron in the electrolyte is capable of impairing the current efficiency considerably. The natural salt deposits containing magnesium chloride and the commercial magnesium chloride solutions obtained therefrom normally contain boric acid and/or salts thereof in such an amount that most of it must be removed when the magnesium chloride is to be used for the molten salt electrolytic production of magnesium.

One method of reducing the boron impurities in the magnesium chloride solutions is to react the boron compounds present in these brine solutions with methanol to form a borate ester which can be removed by distillation. While this effectively removes quantities of boron from the magnesium chloride solutions, it is not entirely satisfactory because in many instances the boron content is still too high to allow these solutions to be used for the electrolytic production of magnesium metal.

The invention contemplates using the esterification process described above in combination with an extraction process whereby the boron levels are reduced below 25 ppm.

THE INVENTION

A two-step process for removing boron impurities from aqueous solutions of magnesium chloride which comprises treating these solutions with more than 3 moles of methanol in the presence of an acid catalyst which forms trimethyl borate and then subsequently removing the trimethyl borate and excess methanol from such solutions by means of distillation and then extracting from the thus-treated solutions any remaining boron compounds by means of a hydrocarbon liquid solvent extraction procedure.

While this technique represents a preferred embodiment of our invention, it is possible to also achieve good boron removal by first treating the magnesium chloride solution with the hydrocarbon liquid to initially reduce the boron values present and to then treat the remaining boron compounds with methanol to produce the trimethyl borate ester and then remove it from the solution by distillation. The magnesium chloride solutions most susceptible to treatment by the processes of the invention contain at least 20% by weight of magnesium chloride.

The preferred hydrocarbon solvent may be any water-immiscible aliphatic hydrocarbon liquid into which the boron compounds may be extracted. A preferred hydrocarbon liquid is toluene although it is understood other hydrocarbon liquids such as kerosene, naphthas and the like may be employed.

The amount of methanol used should be between 3.1–3.5 moles of methanol per mole of boron present in the solutions to be treated. The time necessary to form the trimethyl borate ester varies between as little as a few minutes up to several hours depending upon the temperature of the magnesium chloride solutions.

To effectuate the esterification of the boric acid with the methanol, it is necessary that the pH of the solution be below 7 and, preferably, within the range of 3–5. This can be accomplished by treating with mineral acids such as hydrochloric, sulfuric, and the like.

EXAMPLES

To illustrate the invention, the following is presented by way of example:

500 grams of a 30% magnesium chloride brine containing 500 ppm of boron was used in the evaluation. To this brine was added 250 grams of methanol and 4 milliliters of hydrochloric acid to adjust the pH below 7. This mixture was then heated and subjected to distillation. After 200 grams of overhead were collected, this overhead sample was analyzed and found to contain 80% methanol and 825 ppm of boron. The contents of the pot, while still hot, were treated with 250 grams of toluene with good agitation. After the agitation was discontinued, the top toluene layer contained 320 ppm of boron. The pot material was analyzed and found to contain 20–25 ppm of boron.

Having thus described our invention, it is claimed as follows:

1. A two-step process for removing boron impurities from aqueous solutions of magnesium chloride which comprises treating these solutions with more than 3 moles of methanol in the presence of an acid catalyst to form trimethyl borate and then removing the trimethyl borate and excess methanol from such solutions by means of distillation and then extracting from the thus-treated solutions any remaining boron compounds by means of a hydrocarbon liquid said hydrocarbon liquid, being the sole extracting agent.

2. The method of claim 1 where the hydrocarbon liquid is toluene.

3. A two-step process for removing boron impurities from aqueous solutions of magnesium chloride which comprises extracting from these solutions boron compounds by means of a hydrocarbon liquid, said hydrocarbon liquid, being the sole extracting agent, and then treating these solutions with more than 3 moles of methanol in the presence of an acid catalyst to form trimethyl borate and then removing the trimethyl borate and excess methanol from such solutions by means of distillation.

4. The method of claim 3 where the hydrocarbon liquid is toluene.

* * * * *